US008972256B2

(12) United States Patent
Rennie et al.

(10) Patent No.: US 8,972,256 B2
(45) Date of Patent: Mar. 3, 2015

(54) SYSTEM AND METHOD FOR DYNAMIC NOISE ADAPTATION FOR ROBUST AUTOMATIC SPEECH RECOGNITION

(75) Inventors: Steven J. Rennie, Millwood, NY (US); Pierre Dognin, White Plains, NY (US); Petr Fousek, Litomerice (CZ)

(73) Assignee: Nuance Communications, Inc., Burlington, MA (US)

( * ) Notice: Subject to any disclaimer, the term of this patent is extended or adjusted under 35 U.S.C. 154(b) by 807 days.

(21) Appl. No.: 13/274,694

(22) Filed: Oct. 17, 2011

(65) Prior Publication Data

US 2013/0096915 A1    Apr. 18, 2013

(51) Int. Cl.
*G10L 15/20* (2006.01)

(52) U.S. Cl.
CPC ..................... *G10L 15/20* (2013.01)
USPC .......................... 704/233; 704/226

(58) Field of Classification Search
CPC ....................................... G10L 15/20
USPC ................................. 704/233, 226
See application file for complete search history.

(56) References Cited

U.S. PATENT DOCUMENTS

| | | | | |
|---|---|---|---|---|
| 5,749,068 A * | 5/1998 | Suzuki | | 704/233 |
| 5,970,446 A * | 10/1999 | Goldberg et al. | | 704/233 |
| 6,188,982 B1 * | 2/2001 | Chiang | | 704/256.5 |
| 7,236,930 B2 * | 6/2007 | Bernard et al. | | 704/233 |
| 2002/0087306 A1 * | 7/2002 | Lee et al. | | 704/233 |
| 2002/0165712 A1 * | 11/2002 | Souilmi et al. | | 704/233 |
| 2003/0115055 A1 * | 6/2003 | Gong | | 704/233 |
| 2003/0182114 A1 * | 9/2003 | Dupont | | 704/233 |
| 2003/0191636 A1 * | 10/2003 | Zhou | | 704/226 |
| 2004/0064314 A1 * | 4/2004 | Aubert et al. | | 704/233 |
| 2004/0093210 A1 * | 5/2004 | Toyama | | 704/233 |
| 2004/0158465 A1 * | 8/2004 | Rees | | 704/233 |
| 2004/0260546 A1 * | 12/2004 | Seo et al. | | 704/233 |
| 2005/0071159 A1 * | 3/2005 | Boman et al. | | 704/233 |
| 2006/0195317 A1 * | 8/2006 | Graciarena et al. | | 704/233 |
| 2007/0050189 A1 * | 3/2007 | Cruz-Zeno et al. | | 704/226 |
| 2007/0055508 A1 * | 3/2007 | Zhao et al. | | 704/226 |
| 2009/0076813 A1 * | 3/2009 | Jung et al. | | 704/233 |
| 2009/0187402 A1 * | 7/2009 | Scholl | | 704/233 |
| 2009/0271188 A1 * | 10/2009 | Agapi et al. | | 704/233 |
| 2010/0204988 A1 * | 8/2010 | Xu et al. | | 704/233 |

OTHER PUBLICATIONS

Steven J. Rennie, "Graphical Models for Robust Speech Recognition in Adverse Environments", A PhD thesis submit to Department of Electrical and Computer Engineering University of Toronto, 2008.*

(Continued)

*Primary Examiner* — Jialong He
(74) *Attorney, Agent, or Firm* — Banner & Witcoff, Ltd.

(57) ABSTRACT

A speech processing method and arrangement are described. A dynamic noise adaptation (DNA) model characterizes a speech input reflecting effects of background noise. A null noise DNA model characterizes the speech input based on reflecting a null noise mismatch condition. A DNA interaction model performs Bayesian model selection and re-weighting of the DNA model and the null noise DNA model to realize a modified DNA model characterizing the speech input for automatic speech recognition and compensating for noise to a varying degree depending on relative probabilities of the DNA model and the null noise DNA model.

12 Claims, 3 Drawing Sheets

(56) References Cited

OTHER PUBLICATIONS

Steven J. Rennie et al. "Dynamic noise adaptation." Acoustics, Speech and Signal Processing, 2006. ICASSP 2006 Proceedings. 2006 IEEE International Conference on. vol. 1. IEEE, 2006.*

Kristjansson, et al. "Towards non-stationary model-based noise adaptation for large vocabulary speech recognition." Acoustics, Speech, and Signal Processing, 2001. Proceedings.(ICASSP'01). 2001 IEEE International Conference on. vol. 1. IEEE, 2001.*

* cited by examiner

SYSTEM AND METHOD FOR DYNAMIC NOISE ADAPTATION FOR ROBUST AUTOMATIC SPEECH RECOGNITION

TECHNICAL FIELD

The present invention relates to speech processing, and more specifically to noise adaptation in automatic speech recognition.

BACKGROUND ART

Automatic speech recognition (ASR) systems try to determine a representative meaning (e.g., text) corresponding to speech inputs. Typically, the speech input is processed into a sequence of digital frames which are multi-dimensional vectors that represent various characteristics of the speech signal present during a short time window of the speech. In a continuous speech recognition system, variable numbers of frames are organized as "utterances" representing a period of speech followed by a pause which in real life loosely corresponds to a spoken sentence or phrase. The ASR system compares the input utterances to find statistical acoustic models that best match the vector sequence characteristics and determines corresponding representative text associated with the acoustic models. More formally, given some input observations A, the probability that some string of words W were spoken is represented as P(W|A), where the ASR system attempts to determine the most likely word string:

$$\hat{W} = \underset{W}{\mathrm{argmax}}\, P(W \mid A)$$

Given a system of statistical acoustic models, this formula can be re-expressed as:

$$\hat{W} = \underset{W}{\mathrm{argmax}}\, P(W) P(A \mid W)$$

where P(A|W) corresponds to the acoustic models and P(W) represents the value of a statistical language model reflecting the probability of given word in the recognition vocabulary occurring.

The acoustic models are typically probabilistic state sequence models such as hidden Markov models (HMMs) that model speech sounds using mixtures of probability distribution functions (Gaussians). Acoustic models often represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of a statistical language model.

The words or phrases associated with the best matching model structures are referred to as recognition candidates or hypotheses. A system may produce a single best recognition candidate—the recognition result—or multiple recognition hypotheses in various forms such as an N-best list, a recognition lattice, or a confusion network. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Some ASR systems pre-process the input speech frames (observation vectors) to account for channel effects and noise, for example, using explicit models of noise, channel distortion, and their interaction with speech. Many interesting and effective approximate modeling and inference techniques have been developed to represent these acoustic entities and the reasonably well understood but complicated interactions between them. While there are many results showing the promise of these techniques on less sophisticated systems trained on small amounts of artificially mixed data, there has been little evidence that these techniques can improve state of the art large vocabulary ASR systems.

There a number of fundamental challenges to designing noise-robust ASR systems. Efficient modeling and inference is needed that balances the trade-off between computational complexity and performance. System modeling also needs to be robust to improve system ASR performance in noisy conditions without degrading performance in clean (low-noise) conditions. And robust adaptation also is desired that improves system performance in noise conditions not seen during system training.

Dynamic noise adaptation (DNA) is a model-based technique for improving ASR performance in the presence of noise. See Rennie et al. *Dynamic Noise Adaptation*, Proceedings of IEEE International Conference on Acoustics, Speech and Signal Processing 2006, 14-19 May 2006; Rennie and Dognin, *Beyond Linear Transforms: Efficient Non-Linear Dynamic Adaptation For Noise Robust Speech Recognition*, in Proceedings of the 9th International Conference of Interspeech 2008, Brisbane, Australia, Sep. 23-26, 2008; Rennie et al., *Robust Speech Recognition Using Dynamic Noise Adaptation*, in Proc. IEEE International Conference on Acoustics, Speech, and Signal Processing (ICASSP) 2011, Prague, Czech Republic, May 22-27, 2011; all incorporated herein by reference. DNA is designed to compensate for mismatch between training and testing conditions, and recently, DNA has been shown to improve the performance of even commercial-grade ASR systems trained on large amounts of data. However, new investigations with yet more data and yet stronger baseline systems have revealed that conventional DNA can sometimes harm ASR performance, especially when the existing noise conditions are well characterized by the back-end acoustic models. Such issues could be mitigated by applying the model-based approach to the recognizer itself and training acoustic models of speech that recover a canonical representation of speech, together with a noise model, which could be adapted. But this paradigm is not yet fully mature.

SUMMARY

Embodiments of the present invention are directed to a speech processing method and arrangement. A dynamic noise adaptation (DNA) model characterizes a speech input reflecting effects of background noise. A null noise DNA model characterizes the speech input based on reflecting a null noise mismatch condition. A model adaptation module performs Bayesian model selection and re-weighting of the DNA model and the null noise DNA model to realize a modified DNA model characterizing the speech input for automatic speech recognition and compensating for noise to a varying degree depending on relative probabilities of the DNA model and the null noise DNA model.

The Bayesian model selection and re-weighting may reflect a competing likelihood of which model best characterizes the speech input, for example, by averaging the models, and/or by further decreasing the probability of the DNA model when it does not best characterize the speech input, for example, to zero, and/or by increasing the probability of the DNA model when it best characterizes the input, for example by doubling the probability, and then subtracting 1. The DNA model may include a probability based noise model reflecting transient and evolving components of a current noise estimate.

DETAILED DESCRIPTION

Various embodiments of the present invention are directed to an enhancement of dynamic noise adaptation (DNA) that substantially improves the performance of commercial grade speech recognizers trained on large amounts of data. Embodiments of the present invention automatically detect when mismatch noise modeling is not beneficial. Online Bayesian model selection and averaging is performed to regularize the influence that mismatch noise modeling has on the output clean feature estimate. Specifically, a Null Noise Model (NN) is introduced as a degenerate DNA model which is clamped to a noise-free condition. The NN model competes with the current DNA model which tracks the evolving state of the background noise. The importance of the DNA and the noise-free streams is adaptively inferred and their relative weighting adjusted based on their ability to explain the observed speech features. There is significant performance improvement in low SNR conditions without degrading performance in clean conditions. No prior knowledge about the noise conditions is needed, no system re-training is required, and there is low computational complexity.

More specifically, system noise modeling rapidly adapts during a speech utterance, effectively instantaneously when the noise in a frequency band is inferred to be observed. The uncertainty associated with the current noise estimate is modeled so that the speech/noise decision in each frequency band is more robust than previous noise adaptive techniques. The noise model can decompose noise into transient and evolving components and model the uncertainty associated with these estimates. Such arrangements aid in automatically detecting when explicitly modeling the noise background is not advantageous, so that explicit noise modeling can be shut off. More generally, the noise can be compensated for to a varying degree depending on how much the noise modeling improves the probability of the data under a speech model. This avoids degradation in clean conditions and actually improves ASR performance in low SNR conditions.

Figure 1:
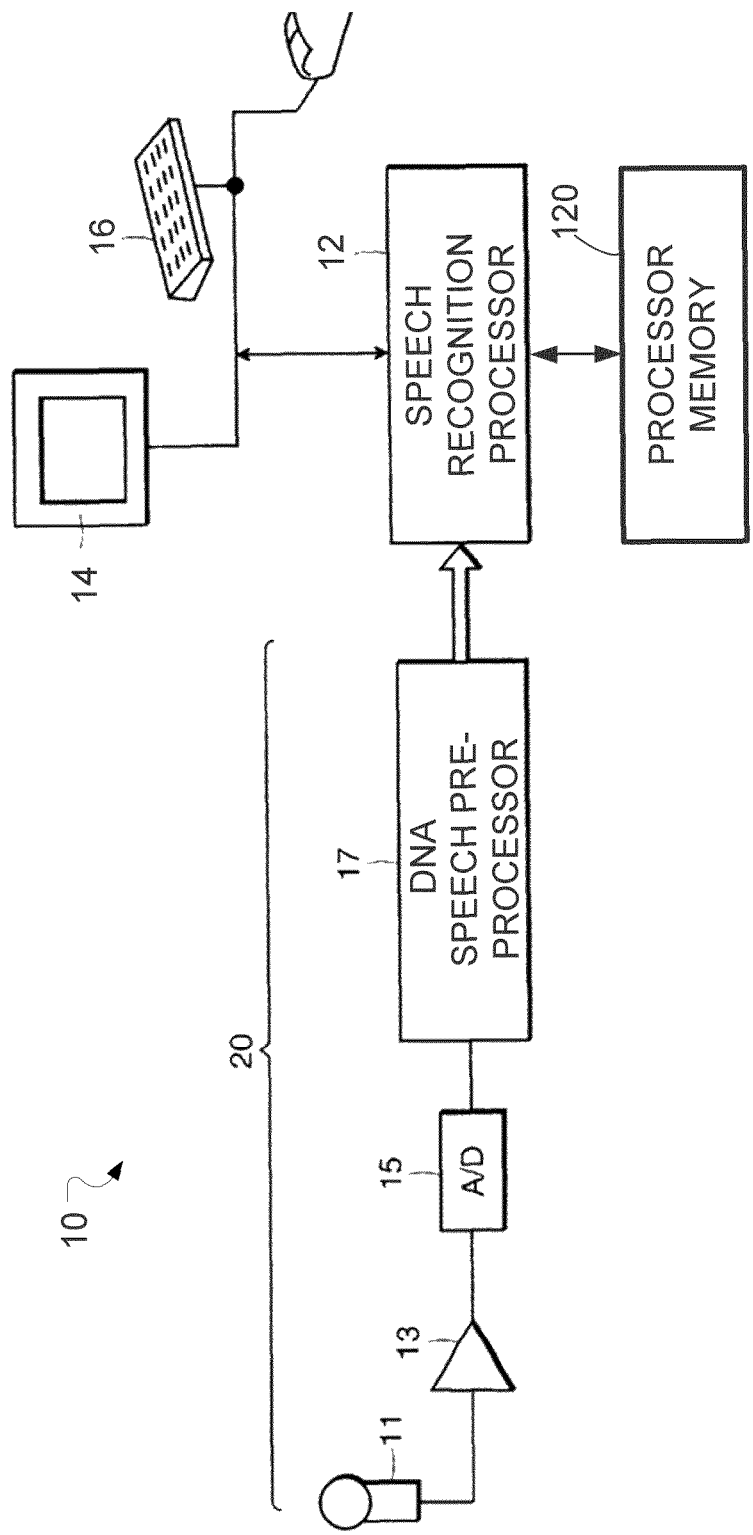
FIG. 1 shows various hardware components of an ASR system according to an embodiment of the present invention.

FIG. 1 shows various hardware components of an embodiment of an ASR system which uses a language model according to the present invention. A computer system 10 includes a speech input microphone 11 which is connected through a suitable preamplifier 13 to an analog-to-digital (A/D) converter 15. A front-end DNA pre-processor 17 typically performs a Fourier transform so as to extract spectral features to characterize the input speech as a sequence of representative multi-dimensional vectors and performs the DNA analysis and adaptation in a potentially derived feature space. A speech recognition processor 12, e.g., an Intel Core i7 processor or the like, is programmed to run one or more specialized computer software processes to determine a recognition output corresponding to the speech input. To that end, processor memory 120, e.g., random access memory (RAM) and/or read-only memory (ROM) stores the speech processing software routines, the speech recognition models and data for use by the speech recognition processor 12. The recognition output may be displayed, for example, as representative text on computer workstation display 14. Such a computer workstation would also typically include a keyboard 16 and a mouse 18 for user interaction with the system 10. Of course, many other typical arrangements are also familiar such as an ASR implemented for a mobile device such as a cell phone, ASR for the cabin of an automobile, client-server based ASR, etc.

A DNA model includes a speech model, a noise model, a channel model, and an interaction model which describes how these acoustic entities combine to generate the observed speech data. The interaction between speech x, noise n and channel effects h is modeled in time domain as:

$$y(t) = h(t) * x(t) + n(t). \quad (1)$$

where * denotes linear convolution. In the frequency domain:

$$|Y|^2 = |H|^2 |X|^2 + |N|^2 + 2|H||X||N|\cos\theta \quad (2)$$
$$= |H|^2 |X|^2 + |N|^2 + \epsilon,$$

where $|X|$ and $\theta_x$ represent the magnitude and phase spectrum of $x(t)$, and $\theta = \theta_x + \theta_h - \theta_n$. Ignoring the phase term $\epsilon$ and assuming that the channel response $|H|$ is constant over each Mel frequency band, in the log Mel spectral domain:

$$y \approx f(x+h, n) = \log(\exp(x+h) + \exp(n)) \quad (3)$$

where y represents the log Mel transform of $|Y|^2$. The error of this approximation can be modeled as zero mean and Gaussian distributed:

$$p(y|x+h,n) = \mathcal{N}(y; f(x+h+n), \psi^2). \quad (4)$$

Figure 2:
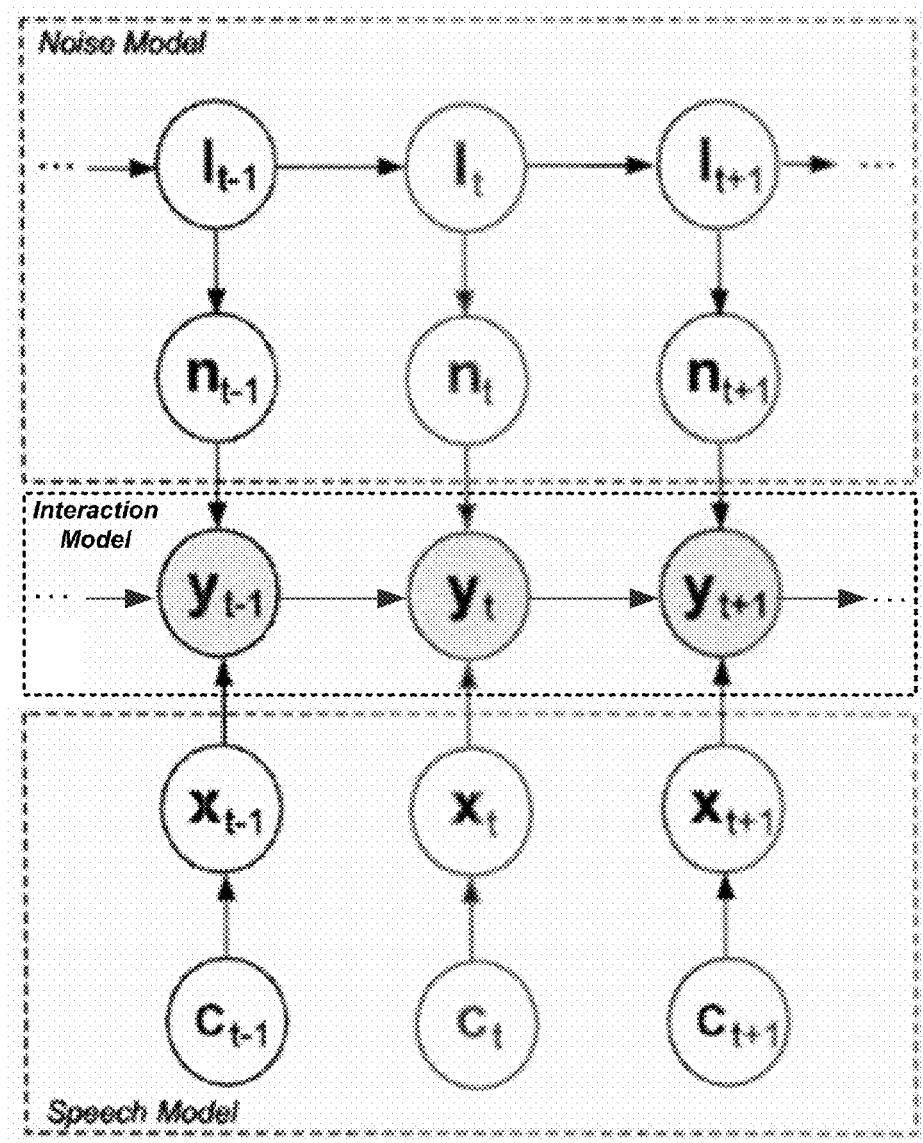
FIG. 2 shows an arrangement for null noise DNA processing according to an embodiment.

FIG. 2 shows a simplified diagram of the DNA architecture (omitting an explicit channel distortion model). In this visually simplified diagram, it can be seen that for a given frame of data at time t, the interaction model for that frame $y_t$, includes a speech observation vector component x, and a noise component $n_1$ like Eq. 4 above:

$$p(y_t | x_t, n_t) = N[y; \ln(\exp(x_t) + \exp(n_t)), \Psi]$$
$$\simeq N[y_t; A_x(x_{t_i}, n_{t_i})x_t + A_n(x_{t_i}, n_{t_i})n_t, \Psi]$$

The speech model can specifically use a band-quantized gaussian mixture model (BQ-GMM) which is a constrained, diagonal covariance Gaussian Mixture Model (GMM). BQ-GMMs have B<<S shared Gaussians per feature, where S is the number of acoustic components, and so can be evaluated very efficiently.

DNA models noise in the Mel spectrum as a Gaussian process. Noise can be separated into evolving and transient components, which facilitates robust tracking of the noise level during inference. The dynamically evolving component of this noise—the noise level—is assumed to be changing slowly relative to the frame rate, and can be modeled as follows:

$$p(l_{f,0}) = \mathcal{N}(l_{f,0}; \beta_f, \omega_{f,0}^2), \quad (5)$$

$$p(l_{f,\tau}|l_{f,\tau-1}) = \mathcal{N}(l_{f,\tau}; l_{f,\tau-1}, \gamma_f^2), \quad (6)$$

where $l_{f,\tau}$ is a random variable representing the noise level in frequency band f at frame $\tau$. Note that it is assumed that the noise evolves independently at each frequency band. The transient component of the noise process at each frequency band is modeled as zero-mean and Gaussian:

$$p(n_{f,\tau}|l_{f,\tau}) = \mathcal{N}(n_{f,\tau}; l_{f,\tau}, \phi_f^2). \quad (7)$$

Channel distortion h can be modeled as a parameter which is stochastically adapted:

$$p(h_{f,\tau}) = \delta(h_{f,\tau} - \hat{h}_f(\tau)), \quad (8)$$

where $\hat{h}_f(r)$ is the current estimate of the channel in frequency bin f at frame $\tau$.

The DNA model can be evaluated in sequential fashion. For a GMM speech model with |s|=K components and an utterance with T frames, the exact noise posterior for a given frame $\tau$ is a $K^T$ component GMM, so approximations need to be made for inference to be tractable. The noise posterior at each given frame may be approximated as Gaussian:

$$p(l_{f,\tau+1}) \approx \mathcal{N}(l_{f,\tau+1}; \beta_{f,\tau+1}, \omega_{f,\tau+1}^2) \quad (9)(10)$$

A variation of Algonquin can be used to iteratively estimate the conditional posterior of the noise level and speech for each speech Gaussian. Algonquin iteratively linearizes the interaction function given a context-dependent expansion point, usually taken as the current estimates of the speech and noise. For a given Gaussian $\alpha$:

$$p(y|x, n, h) \approx \mathcal{N}(y: \alpha_a(x+h) + (1-\alpha_a)n + b_a \cdot \psi^2), \quad (11)$$

$$\alpha_a = \frac{\delta f}{\delta x}\bigg|_{\hat{x}_a, \hat{l}_a, \hat{n}_a} = \frac{|\hat{H}_a|^2|\hat{X}_a|^2}{|\hat{H}_a|^2|\hat{X}_a|^2 + |\hat{N}_a|^2}, \quad (12)$$

$$b_a = f(\hat{x}_a + \hat{h}_a \cdot \hat{n}_a) - \alpha_a(\hat{x}_a + \hat{h}_a - \hat{n}_a) - \hat{n}_a. \quad (13)$$

Given $\alpha_a$, the posterior distribution of x and n is Gaussian. Once the final estimate of $\alpha_a$ has been determined, the posterior distribution of l can be determined by integrating out the speech and transient noise to get a Gaussian posterior likelihood for l, and then combining it with the current noise level prior. This is more efficient than unnecessarily computing the joint posterior of x, n, and l.

The approximate Minimum Mean Square Error (MMSE) estimate of the Mel speech features for frame $\tau$ under DNA is:

$$\hat{x}_{f,\tau} = E[x_{f,\tau}|y_{0:\tau}] = \sum_{s_\tau} p(s_\tau|y_{0:\tau})E[x_{f,\tau}|y_{0:\tau}, s_\tau]. \quad (14)$$

These features can be passed to the ASR backend for speech recognition.

To detect matched noise conditions, a Null Noise Model (NN) (a degenerate DNA model) is introduced to compete with the current DNA model. Let $M_{DNA}$ and $M_{matched}$ denote the current estimates of the DNA model and Null Noise Model (NN) respectively. The posterior probability of the DNA model for a given frame of data is given by:

$$p(\mathcal{M}_{DNA}|y_t) = \frac{1}{1+\exp(-\alpha f(y_t))}, \quad (15)$$

where $$f(y_t) = g(y_t) + c, \quad (16)$$

with $$g(y_t) = \log\frac{p(y_t|\mathcal{M}_{DNA})}{p(y_t|\mathcal{M}_{matched})}, c = \log\frac{p(\mathcal{M}_{DNA})}{p(\mathcal{M}_{matched})}, \quad (17)$$

and $\alpha=1$. This is simply Bayes' rule for a binary random variable, with states $M_{DNA}$ and $M_{matched}$ respectively. $\alpha$ can be tuned to control how "sharp" the posterior estimate is. $f(y_t)$ consists of two terms—$g(y_t)$ which is simply the log likelihood ratio of the two models, and c which is a bias term equal to the log of the prior ratio of the models.

Equation (15) does not directly take into account the relative complexity of the models that are competing to explain the observed speech data. When deciding what model best represents the observed test features, it makes sense to penalize model complexity. In this case, one model is actually contained within the other. If the clean model can explain the speech data just as well as the DNA model, then the clean model should have higher posterior probability because it has fewer parameters. Equation (15) estimates a frame-level model posterior for the DNA model which itself evolves stochastically in online fashion to adapt to changing noise conditions. Here the model posterior at time t given all previous data $y_{0:t}$ can be approximated as:

$$p(\mathcal{M}_{DNA}|y_{0:t}) = \gamma p(\mathcal{M}_{DNA}|y_{0:t-1}) + (1-\gamma)p(\mathcal{M}_{matched}|y_t), \gamma \in (0,1) \quad (18)$$

The clean speech estimate output at time t is then given by:

$$E[x_t|y_{0:t}] = p(\mathcal{M}_{DNA}|y_{0:t})E_{\mathcal{M}_{DNA}}[x|y_{0:t}] + \quad (19)$$

$$(1-p(\mathcal{M}_{DNA}|y_{0:t}))E_{\mathcal{M}_{matched}}[x|y_{0:t}]$$

Note that the state of the DNA noise model is not affected by the current posterior probability of the competing model. In a previous investigation a competing noise model was introduced to make DNA more robust to abrupt changes in the noise level. When a reset condition was triggered by a high noise model probability, the evolving noise model in DNA would be re-initialized. But in embodiments of the present invention, the NN model competes with DNA only for influence in the reconstructed speech estimate.

Figure 3:
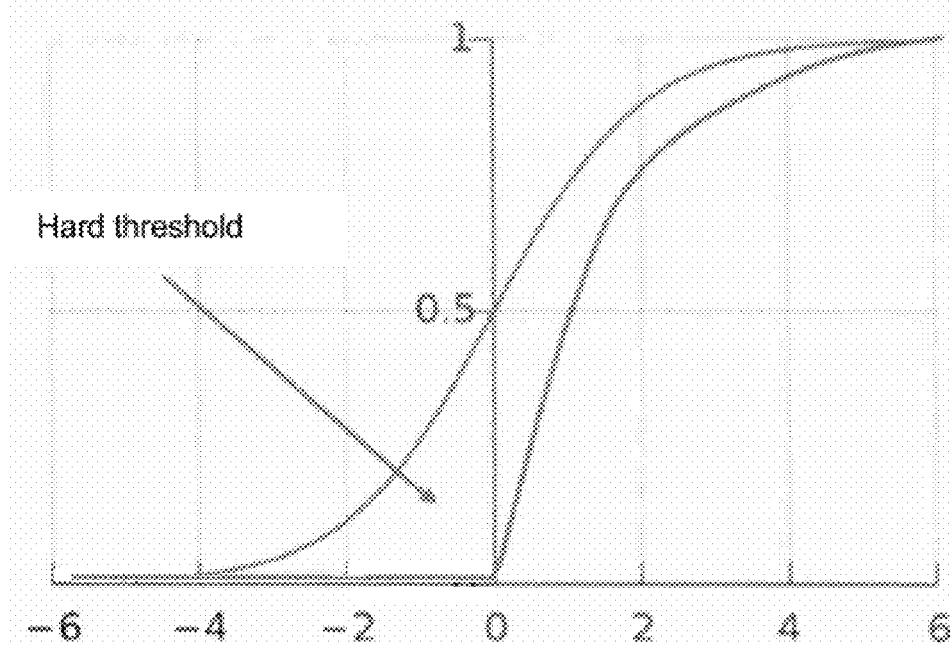
FIG. 3 shows a graph illustrating use of a hard threshold probability between the competing DNA models.

Several criterion (Akaike, MDL, etc.) exist for penalizing the number of parameters in a model when doing model selection. For example, a simple online adaptive model selection scheme could assign zero probability to the DNA model if the clean model can just as well explain the observed speech data, and then correspondingly increase the probability under the standard model averaging update when DNA is the better explanation. FIG. 3 shows one example of use of such a thresholding arrangement where:

$$\hat{p}_t = \begin{cases} 2p_t - 1, & p_t > \frac{1}{2} \\ 0, & \text{otherwise} \end{cases}$$

Embodiments of the present invention such as those described above improve ASR performance in clean noise conditions, by allowing a noise-free NN speech model to compete with the DNA model. Experimental results indicate that use of the NN model improves the Sentence Error Rate (SER) of a state-of-the-art embedded speech recognizer that utilizes commercial grade feature-space Maximum Mutual Information (fMMI), boosted MMI (bMMI), and feature-space Maximum Likelihood Linear Regression (fMLLR) compensation by 15% relative at signal-to-noise ratios (SNRs) below 10 dB, and over 8% relative overall.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components. For example, a pseudo code representation of such an embodiment might be set forth as follows:

Process DNA_Null_Noise
   DNA(speech_input);
   DNA_NN(speech input);
   DNA_select(DNA, DNA_NN).

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:
   characterizing, by a computing device, a speech input based on a dynamic noise adaptation (DNA) model reflecting effects of background noise;
   characterizing the speech input based on a null noise DNA model reflecting a null noise mismatch condition; and
   performing Bayesian model selection and re-weighting of the DNA model and the null noise DNA model to realize a modified DNA model characterizing the speech input for automatic speech recognition and compensating for noise to a varying degree depending on relative probabilities of the DNA model and the null noise DNA model,
   wherein the Bayesian model selection and re-weighting reflects a competing likelihood of which model best characterizes the speech input, and
   wherein re-weighting the DNA model and the null noise DNA model includes assigning zero probability to the DNA model predicted by Bayesian model averaging when the DNA model does not best characterize the speech input.

2. The method of claim 1, wherein re-weighting the DNA model and the null noise DNA model includes averaging.

3. The method of claim 1, wherein re-weighting the DNA model and the null noise DNA model includes increasing the probability of the DNA model predicted by Bayesian model averaging when the DNA model best characterizes the speech input.

4. The method of claim 1, wherein the DNA model includes a probability based noise model reflecting transient and evolving components of a current noise estimate.

5. A non-transitory computer-readable medium storing computer-readable instructions that, when executed by a processor, cause a device to:
   characterize a speech input based on a dynamic noise adaptation (DNA) model reflecting effects of background noise;
   characterize the speech input based on a null noise DNA model reflecting a null noise mismatch condition; and
   perform Bayesian model selection and re-weighting of the DNA model and the null noise DNA model to realize a modified DNA model characterizing the speech input for automatic speech recognition and compensating for noise to a varying degree depending on relative probabilities of the DNA model and the null noise DNA model,
   wherein the Bayesian model selection and re-weighting reflects a competing likelihood of which model best characterizes the speech input, and
   wherein re-weighting the DNA model and the null noise DNA model includes assigning zero probability to the DNA model predicted by Bayesian model averaging when the DNA model does not best characterize the speech input.

6. The non-transitory computer-readable medium of claim 5, wherein re-weighting the DNA model and the null noise DNA model includes averaging.

7. The non-transitory computer-readable medium of claim 5, wherein re-weighting the DNA model and the null noise DNA model includes increasing the probability of the DNA model predicted by Bayesian model averaging when the DNA model best characterizes the speech input.

8. The non-transitory computer-readable medium of claim 5, wherein the DNA model includes a probability based noise model reflecting transient and evolving components of a current noise estimate.

9. A method comprising:
   characterizing, by a computing device, a speech input based on a dynamic noise adaptation (DNA) model reflecting effects of background noise;

characterizing the speech input based on a null noise DNA model reflecting a null noise mismatch condition; and performing Bayesian model selection and re-weighting of the DNA model and the null noise DNA model to realize a modified DNA model characterizing the speech input for automatic speech recognition and compensating for noise to a varying degree depending on relative probabilities of the DNA model and the null noise DNA model, wherein the Bayesian model selection and re-weighting reflects a competing likelihood of which model best characterizes the speech input, wherein re-weighting the DNA model and the null noise DNA model includes reducing the probability of the DNA model predicted by Bayesian model averaging when the DNA model does not best characterize the speech input, and wherein re-weighting the DNA model and the null noise DNA model includes increasing the probability of the DNA model predicted by Bayesian model averaging when the DNA model best characterizes the speech input.

10. The method of claim 9, wherein re-weighting the DNA model and the null noise DNA model includes averaging.

11. The method of claim 9, wherein re-weighting the DNA model and the null noise DNA model includes assigning zero probability to the DNA model predicted by Bayesian model averaging when the DNA model does not best characterize the speech input.

12. The method of claim 9, wherein the DNA model includes a probability based noise model reflecting transient and evolving components of a current noise estimate.

* * * * *